Figure 6:
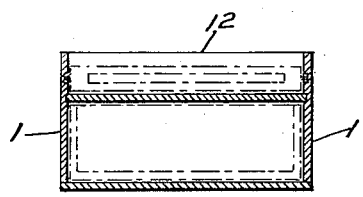

Nov. 27, 1951     G. M. THOMPSON     2,576,730

VANITY BOX

Filed Feb. 23, 1950

Inventor
Guy M. Thompson
By Chas. Denegre
Attorney

UNITED STATES PATENT OFFICE 2,576,730

VANITY BOX

Guy M. Thompson, Birmingham, Ala.

Application February 23, 1950, Serial No. 145,714

1 Claim. (Cl. 132—83)

This invention relates to a vanity box. It has for its main objects to provide such a box that will be highly efficient for its purpose, simple in structure, cheap to manufacture, easy to use, very attractive in appearance, and extremely durable. There are various kinds of such boxes in use, but generally they are expensive and complicated.

Other objects and advantages will appear from the drawing and description.

Figure 1:
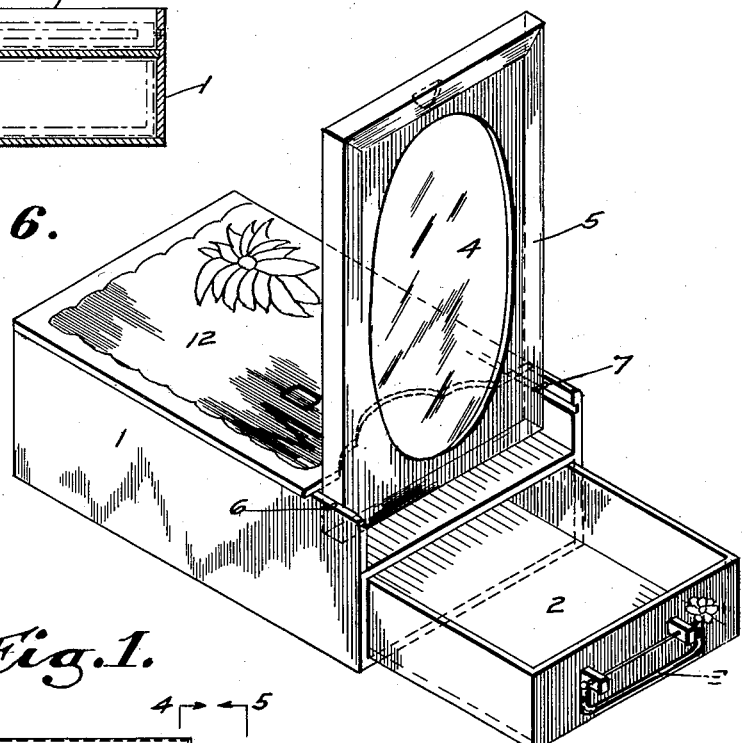
Figure 2:
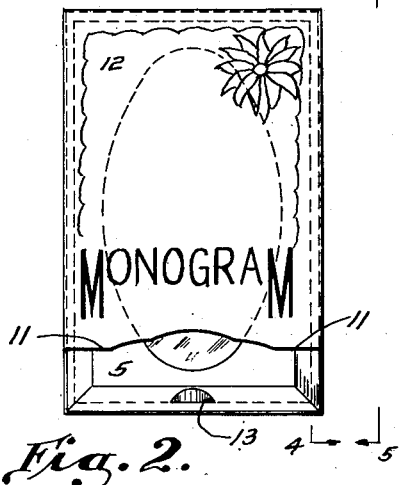
Figure 4:
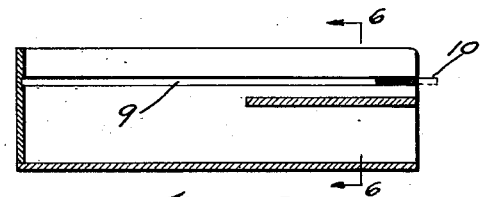
Figure 5:
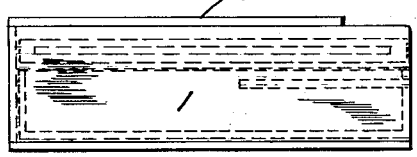
Figure 3:
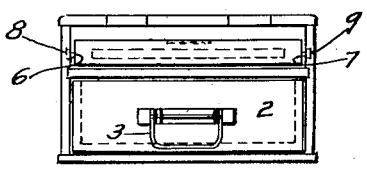

By referring generally to the drawing, part of this application, it will be observed that Fig. 1 is a perspective view of the box in open condition; Fig. 2 is a top plan view of the box in closed condition; Fig. 3 is a front elevational end view of the box in closed condition; Fig. 4 is a sectional view on line 4—4 of Fig. 2; Fig. 5 is a side view on line 5—5 of Fig. 2; and Fig. 6 is a sectional view on line 6—6 of Fig. 4. Similar reference numerals refer to similar parts throughout the several views.

Referring to the drawing in detail it will be seen that the box assembly comprises a main body 1 with an open front end, a slidable drawer 2 with handle 3, a mirror 4 in a frame 5. The mirror frame is provided with metal pins 6 and 7 that extend into grooves 8 and 9 in the side walls of the main body. In the front end of groove 9 a tight fitting wooden peg 10 is used to abut the pin when the mirror is in use as shown in Fig. 1. Also this peg is adapted for removal in order for a new mirror and frame to be installed in case of breakage. The frame is held in upright position for use as a result of the pins, one extending into the front end portion of groove 8 that stops short of the front edge of the body wall, with the other pin adjacent the inner end of the peg 10, while the lower back portion of the frame rests against the front edge 11 of the fixed top panel 12 of the main body. The mirror frame is provided wiht an indenture 13 for use in pulling the mirror out of its rest position under the top of the main body.

From the foregoing it will appear that in compact condition the vanity box will be as plainly shown in Fig. 2, and for use will be in open condition as plainly shown in Fig. 1.

The box and fixtures therefor may be made of any material suitable for the purpose, but I prefer to use wood or plastic with a good grade of mirror and attractive metal for the drawer handle. Also the box may be made in different sizes and capacities, depending on whether to be used for its main purpose or as a doll size.

While I have shown and described the preferred embodiment of my invention, I do not wish to limit same to the exact and precise details of structure, but reserve the right to make all modifications and changes so long as they remain within the scope of the invention and the following claim.

Having described my invention I claim:

In a vanity box of the character described, a framed mirror, said mirror mounted slidably in the upper portion of the box, a groove in the inner face upper portion of each side wall of the box, a pin fixed in each side of one end portion of the mirror frame, the free ends of said pins being slidable in said grooves, one of said grooves terminating short of one end of the box the said end being the front thereof, the opposite groove terminating flush with the same end of the box, a peg equal in length to the nonextended portion of the said shorter groove, said peg being removably inserted in the end of the groove that ends flush with the box end and being adapted to retain the mirror in position for use.

GUY M. THOMPSON.

REFERENCES CITED

The following references are of record in the file of this patent:

UNITED STATES PATENTS

| Number | Name | Date |
|---|---|---|
| 1,108,082 | Pennock | Aug. 18, 1914 |
| 1,459,181 | Klebba | June 19, 1923 |
| 2,406,450 | Winslow | Aug. 27, 1946 |